May 12, 1959   J. W. FREDERIKSEN, SR   2,885,818
FISHING LURE
Filed April 25, 1957
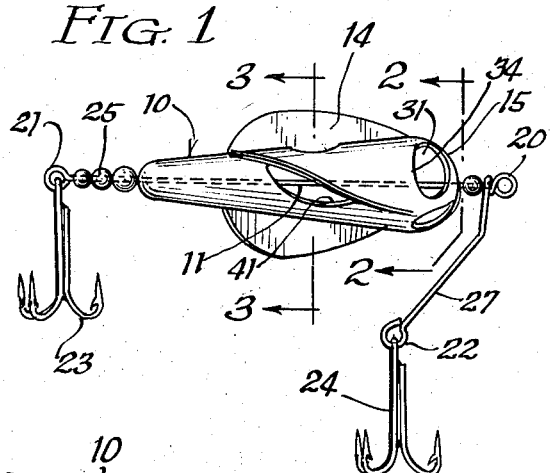
FIG. 1
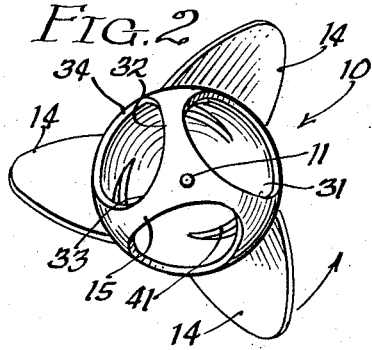
FIG. 2
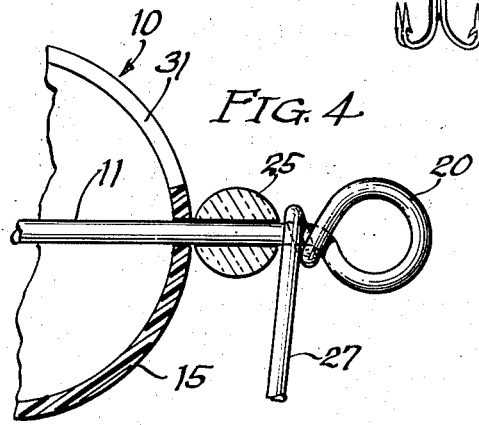
FIG. 4
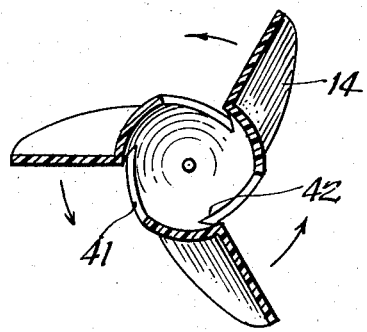
FIG. 3
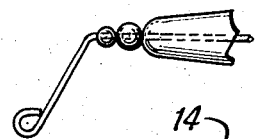
FIG. 5
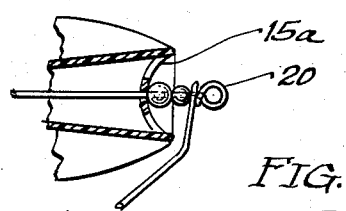
FIG. 6
FIG. 8
FIG. 7
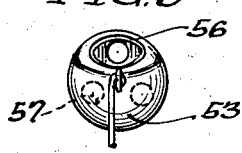
FIG. 9
INVENTOR.
Jordan W. Frederiksen, Sr.
BY
Attorney

United States Patent Office 2,885,818
Patented May 12, 1959

2,885,818

FISHING LURE

Jordan W. Frederiksen, Sr., Chicago, Ill.

Application April 25, 1957, Serial No. 655,078

10 Claims. (Cl. 43—42.06)

This invention relates to a fishing lure. In particular it has reference to a lure adapted to be secured to a fishing line or the leader thereof and to carry a plurality of fish hooks.

Regarded in one aspect the principal object of this invention is to provide a lure which, as it is drawn through the water or caused to skim over the surface thereof, is capable of rotating and, in so doing, producing a sound of a character to attract the fish. In this connection studies have shown that many fish hunt their food not only by a visual sense but by an auditory sense as well and that a lure which embodies both characteristics is more likely to reward the fisherman. Moreover the type of sound produced must be chosen to simulate, to the greatest possible degree, the intermittent sounds made by a fish in expelling water through its gills and by its fins displacing the water.

In another aspect the invention has for its object the provision of a lure as aforesaid which is provided with propelling vanes on a body which is centrally or eccentrically positioned on an axis of rotation to impart a rotational, gyratory or wobbling movement whereby to simulate the movements of a swimming fish with or without the sound-producing characteristic mentioned above.

Another object is to provide a lure as aforesaid in which the axis of rotation is a shaft terminating at one end in an integrally formed hanger for supporting fish hooks whereby the manufacturing cost is materially reduced.

Other objects will become apparent from the ensuing description which, taken with the accompanying drawing discloses certain forms which the invention may assume in practice.

In this drawing:

Fig. 1 shows a side elevation of a lure embodying the principles of the invention;

Fig. 2 is a cross section taken on the line 2—2 of Fig. 1;

Fig. 3 is a cross section taken on the line 3—3 of Fig. 1;

Fig. 4 is a detail central section of the nose portion of the lure showing details of the forward end of the shaft;

Fig. 5 is a detail side elevation of an alternative termination for the tail end of the lure shaft;

Fig. 6 is a detail central section showing an alternative form of nose for the lure;

Fig. 7 is a detail transverse section of an eccentric bearing which may be utilized at either or both ends of the lure;

Fig. 8 is a partial sectional view similar to that of Fig. 1 but illustrating another modification; and Fig. 9 is an end elevation taken in the direction of the arrows 9—9 of Fig. 8.

Turning now to the drawing (Figs. 1 to 4) there is shown a lure comprising a body 10 preferably elongated, carried for rotation on a shaft 11. The body 10 is constructed to incorporate passages for passage of air and/or water from the forward end of the body or nose to exit openings in the lateral surface thereof and, to this end, may be completely hollow or of some other form defining such passages, as will appear. Thus, in the former case the body may be of sheet metal sections suitably formed and fastened, or of one piece molded from a plastic composition.

In order to cause rotation of the lure as the same is drawn through or upon the surface of the water at the end of a fishing line I provide a plurality of propeller vanes 14 disposed on the lateral surface of the body 10. The number of vanes is variable but for all practical purposes I have found that three are sufficient.

The nose or forward end 15 of the body is preferably rounded in order to resemble, in that region, the live object which the lure is calculated to simulate. Moreover the tapered or conical configuration of the body generally is designed to further this illusion. Such shape per se is well known in this art.

The shaft 11 terminates at its tail end in a loop 21 for attachment of hooks 23 of any desired form and arrangement. One or more beads 25 are interposed at both ends of the shaft and the body 10 to relieve thrust load. Such beads are usually of various colors to attract the fish. The line or leader is attached to the loop 20.

In order to stabilize the rotational axis of the lure the forward end desirably carries a depending support 27 terminating in a loop 22 for mounting of additional hooks 24. Such support is, in the interests of manufacturing convenience, integral with the shaft 11 (Fig. 4), being formed by suitably twisting a piece of wire, as shown. If desired the support may be disposed below the tail end of the lure (Fig. 5) or there may be a similar support at both ends of the lure. In any case the shaft 11 is desirably stabilized to provide an axis about which the body 10 may be rotated by the vanes as the lure is propelled through the water.

The burbling sound characterizing the invention lure results from the provision of a plurality of passages having their entrance at the nose of the lure and their exit adjacent the vanes at the rotary leading face thereof. Such passages may be individually provided in a solid lure body by appropriate coring or may comprise a single passage having a plurality of entrances and exits, as in the example. Thus, there is shown a plurality of entrance openings 31, e.g. three in number which, together, occupy a substantial expanse of the nose 15.

Adjacent the root of each vane 14 and on the rotary side thereof there is provided a plurality of exit openings 41, one individual to each vane. Preferably one margin 42 of the openings is coextensive with the junction of the root of the vane with the body 10. Additionally the area of each exit opening 41 is somewhat less than the area of each entrance opening 31, as shown, or stated otherwise, the total area available for entrance is made greater than that made available for exit. In operation water and/or air enters the openings 31 and exits at the openings 41 where, due to the constricted passage, the pressure at exit exceeds that at entrance. This differential in pressure combined with rotation of the vanes results in a burbling sound simulating to a great degree the sounds made by various fishes during respiration and by the fins displacing the water whereby the fish is lulled into believing that the lure is a living victim. Although the mode of operation of my lure has not been determined with certainty it is believed that the vanes, during their rotation churn the several streams of water issuing from the apertures 41 to contribute to the production of a distinctive burbling sound. When the lure is drawn through the water only partly submerged the admixture of air and water combined with the churning action of the vanes yields a similar sound but one which is even more evident.

Experience has demonstrated that constant movement of a lure is not as likely to deceive the fish as does a wobbling movement and, therefore, in order to enhance the lifelike behaviour of the lure the same may be given an eccentric or gyratory motion on its shaft by displacing one or the other, or both end bearings in the manner of Fig. 7, where the shaft 11 is displaced an amount $e$ from the geometrical axis of the body.

Various departures from the several modes of construction and operation hereinabove disclosed may be realized within the scope of the invention. For example, the nose 15a may be concave rather than convex (Fig. 6) whereby the same may act as a scoop when the lure is propelled only partly submerged. In this case a plurality of perforations on the forward end of the lure constitute the entrances for water entering the lure. Moreover the concave form will tend to impart an intermittent diving and bobbing action lending still additional reality to the behaviour of the article. If desired the rotatable part of the lure may be confined to a body part carrying the propeller vanes and the nose piece made separately therefrom but adjacent thereto. That is to say, the nose will be non-revoluble. However the passages in the body portion will continue to be in fluid communication with a space provided within the nose of the lure and of which the apertures providing fluid entrance thereto are a continuation.

Thus referring to Figs. 8 and 9 there is shown a modified form of the invention comprising a hollow body 50 carrying vanes 14 and having exit apertures 41 as in Fig. 1. A shaft 52 is secured at one end in a non-rotatable nose piece 53 in order that the body 50 may be rotated upon the shaft in the manner of the embodiment of Fig. 1. Minimum running clearance 55 is allowed between the body 50 and nose piece 53. Water enters the lure through an aperture 56 in the nose piece 53 and passes into the body 50 through one or more apertures 57 and 58 respectively in the adjoining walls 61 and 62 of the nose piece 53 and body 50. The apertures 57 and 58 may be of any desired area consistent with the respective requirements that the shaft 52 be supported in the nose piece 53 and that there be provided a bearing at the right hand end of the body part to support the same on the shaft. Accordingly the area of the apertures 57 and 58 may be of arcuate extent over almost 360° since the respective shaft support and shaft engaging portions may be at the ends of radial arms extending from the nose piece and body part respectively. Otherwise, the function is the same as described in connection with Fig. 1.

As shown the nose piece 53 is shovel-shaped in order that a diving action may be imparted to the lure by manipulation of the fishing rod. However, the nose piece may assume any other known exterior configuration.

While I have shown certain embodiments of my invention, it will be understood, of course, that I do not wish to be limited thereto since many modifications may be made and I therefore contemplate by the appended claims to cover any such modifications as fall within the true spirit and scope of my invention.

I claim:

1. A fish lure comprising a body, a shaft for mounting said body for rotation, a plurality of propeller vanes carried on said body for rotating the same as the lure is drawn through the water, means at the forward end of the body defining first openings for entrance of water, means on said body defining a plurality of second openings disposed intermediate said vanes for exit of water, means defining a passage in said body connecting the entrance openings with the exit openings whereby the issuing streams of water are interrupted by the rotating vanes, and means attached to said shaft for securing the fishing line.

2. A lure in accordance with claim 1 wherein each said second opening has a marginal portion coincident with the root of the respective vane.

3. A fish lure comprising an elongated, shell-like body having a nose at the leading end and a lateral wall, a shaft for mounting said body for rotation, a plurality of propeller vanes on said wall for rotating the body as the lure is drawn through the water, said nose having a plurality of first openings for entrance of water, said wall having a plurality of second openings intermediate said vanes for exit of water, said first and second openings being in fluid communication through the hollow interior of the body whereby water flowing through said first openings and body and exiting at said second openings is interrupted by the rotating vanes, and means on said shaft for attachment of the lure to the fishing line.

4. A lure in accordance with claim 3 wherein said body is of conical exterior configuration, said nose being adjacent the base thereof.

5. A fish lure comprising a hollow, substantially conical body having a lateral wall and a base at the forward end of the lure and a substantially hemispherical nose as a termination of said forward end, a shaft, bearing means on the body for mounting the same on said shaft for rotation, a plurality of propeller vanes spaced apart about the exterior of the lateral wall of the body and extending substantially radially thereof to rotate the body as the lure is drawn through the water, said nose having a plurality of entrance openings and said lateral wall having a plurality of exit openings respectively positioned adjacent the root of the several vanes, the space within the body providing fluid communication between the entrance and exit openings whereby water admitted to the entrance openings is expelled through the exit openings in an interrupted flow due to the action of the vanes during rotation of the lure.

6. A fish lure comprising a body, a shaft for mounting said body for rotation, a plurality of propellor vanes carried on said body for rotating the same as the lure is drawn through the water, means at the forward end of the body defining a first opening for entrance of water, means on said body defining a plurality of second openings disposed intermediate said vanes for exit of water, means defining a passage in said body connecting the entrance opening with the exit openings whereby the issuing streams of water are interrupted by the rotating vanes, and means attached to said shaft for securing the fishing line.

7. A fish lure comprising a rotatable body, a non-rotatable nose piece adjacent the forward end of the body, a shaft carried by said nose piece for supporting said body for rotation, a plurality of propeller vanes carried on said body for rotating the same as the lure is drawn through the water, said body and nose piece having confronting wall portions defining a running clearance therebetween, said nose piece having a first opening for entrance of water, said wall portions having respective intercommunicating apertures for passage of water, means on said body defining a plurality of second openings disposed intermediate said vanes for exit of water, means defining a passage in said nose piece placing said first opening and said nose piece aperture in fluid communication, means defining a passage in said body placing said second openings and said body aperture in fluid communication whereby flow of water entering the nose piece and exiting from said body is interrupted by the rotating vanes, and means attached to said shaft for securing the fishing line.

8. A fish lure adapted to be propelled through the water by the fisherman comprising a rotatable body elongated in the direction of propulsion and having an interior chamber; a nose piece adjacent the forward end of the body; means carried by said nose piece to support said body for rotation; at least one fin on the exterior of said body to convert linear movement thereof into rotation thereof; said nose piece having means providing a front aperture for entry of water to the interior of said nose piece, means providing a rear aperture for exit of water from said nose piece and passage means providing fluid communication between said apertures; means at the front end of said body providing an entrance aperture confronting said nose piece rear aperture for flow of water from said nose piece to the interior of said body; means on said body providing at least one aperture for exit of water from said chamber, and means on said body defining a passage for fluid communication between the body entrance aperture and body exit aperture.

9. A lure in accordance with claim 8 wherein said body exit aperture is positioned adjacent said fin.

10. A lure in accordance with claim 8 wherein said body exit aperture is positioned adjacent said fin on the rotary leading side thereof.

References Cited in the file of this patent

UNITED STATES PATENTS

| | | |
|---|---|---|
| 1,395,533 | Tuttle | Nov. 1, 1921 |
| 1,931,932 | Myers et al. | Oct. 24, 1933 |
| 2,435,993 | Zink | Feb. 17, 1948 |
| 2,545,398 | Warobiew | Mar. 13, 1951 |
| 2,662,330 | Ogburn | Dec. 15, 1953 |
| 2,665,516 | Race | Jan. 12, 1954 |
| 2,691,235 | Pcola | Oct. 12, 1954 |
| 2,748,522 | Mulcahey | June 5, 1956 |

FOREIGN PATENTS

| | | |
|---|---|---|
| 710,939 | Great Britain | June 23, 1954 |